Feb. 17, 1959   J. D. BALDWIN, JR   2,873,985
TUBE COUPLING INCLUDING A PUSHED
DEFORMABLE TUBE CUTTING WEDGE
Filed Sept. 22, 1953

INVENTOR.
JOHN D. BALDWIN, JR.

BY RICHEY, WATTS, EDGERTON & McNENNY

ATTORNEYS

2,873,985

TUBE COUPLING INCLUDING A PUSHED DEFORMABLE TUBE CUTTING WEDGE

John D. Baldwin, Jr., Highland Heights, Ohio, assignor to The Weatherhead Company, Cleveland, Ohio, a corporation of Ohio Application September 22, 1953, Serial No. 381,568

2 Claims. (Cl. 285—342)

This invention relates to an improved fluid coupling for use with metal tubing of the general type wherein a cutting ring is cammed radially inwardly and cuts into the outer surface of the tube thereby providing a radially extending abutting engagement which resists axial stressing upon the tubing.

It is an important object of this invention to provide a fitting for use with metal tubing which will withstand extremely high pressures and which will also resist mechanical vibrations and strains.

It is another object of this invention to provide a fitting for use with metal tubing which by virtue of its structural shape is economical to produce by high production low cost method of manufacture.

It is still another object of this invention to provide a fitting for use with metal tubing wherein a forward portion of the fitting is compressed into the outer surface of the tubing thereby providing a fluid seal therebetween and wherein a groove is cut in the surface of the tube to provide a radially extending abutting surface which will resist axial strains.

It is still another object of this invention to provide a fitting for use with metal tubing which provides support for the tubing on both sides of the sealing area which support makes the fitting more immune to vibration and strains.

Further objects and advantages will appear from the following description and drawings, wherein.

Figure 1:
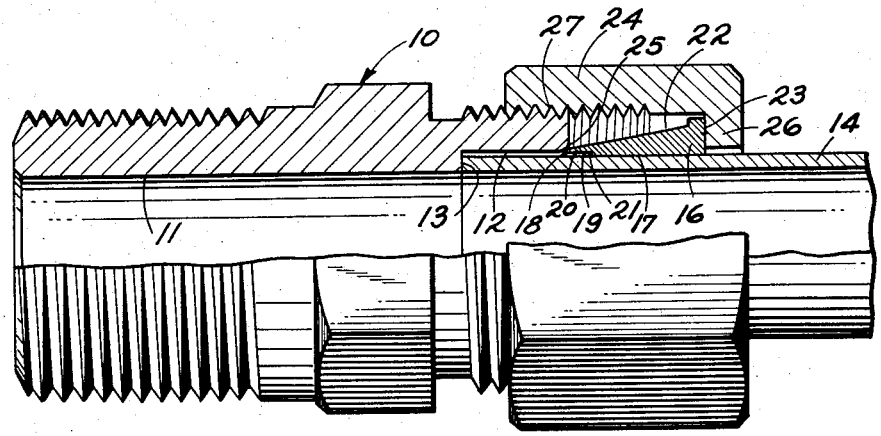
Fig. 1 is a side elevation partially in cross section showing one embodiment of this invention loosely assembled.

A fitting according to this invention comprises a coupling or body member formed with a bore adapted to receive a tube and providing a shoulder adapted to engage the end of the tube and limit the axial movement of the tube into the bore. A sealing ring is formed with a cutting edge adapted to engage and cut a groove in the outer surface of the tube at a point spaced from the end of the tube. The sealing ring is also provided with a pilot portion adapted to engage the outer surface of the tube portion forward of the groove and arranged so that the assembly of the fitting provides relative axial movement between the pilot portion and the outer surface of the tube so that a wiping action occurs between these surfaces at this engagement which cleans the tube and sealing ring to provide a highly efficient fluid seal. The outer surface of the ring is formed with a conical surface extending from a maximum diameter at the rearward end of the sleeve toward the pilot portion which is adapted to engage the bore in the coupling or body member when the ring is moved axially relative thereto so that the pilot portion and cutting edge are both cammed inwardly against the outer surface of the tube. Nut means are also provided to urge the ring axially into the bore.

Referring to the drawings, the coupling or body member 10 is provided with a through bore 11 and a larger coaxial counter bore 12. The counter bore 12 terminates in an abutting shoulder 13 which extends between the counter bore 12 and the through bore 11. The tubing 14 extends into the bore 12 and the end thereof engages the shoulder 13.

A sealing ring 16 of a metal harder than the tube 14 is formed with a through bore 17 adapted to closely fit over the tube 14. The sealing ring 16 is under cut as at 19 thereby providing a cutting edge 21 spaced from the forward end of the tube 18. That portion of the ring forward of the cutting edge 21 forms a pilot portion 20. The outer surface of the sealing ring is formed with a conical surface 22 extending from adjacent to the end 18 to the substantial radial shoulder 23.

A nut 24 is provided with internal threads adapted to engage external threads on the outer surface of the body member 10 and is formed with a depending flange 26 adapted to engage the shoulder 23 of the sealing ring 16. A nut 24 thereby provides means for axially urging the sealing ring into the connecting part 10.

In the preferred embodiment of this invention the outside diameter of the end 18 of the sealing ring 16 is proportioned so as to be slightly larger than the diameter of the counter bore 12 in the body member 10. The body member 10 is formed with a rounded surface 25 adjacent to the mouth of the counter bore 12 which is engaged by the end 18 of the ring 16 during the initial assembly of the fitting. This rounded surface 25 cams the end 18 of the ring inwardly so that it will pass into the counter bore 12 thereby starting the pilot portion into the body 10 during this initial portion of the assembly.

Figure 2:
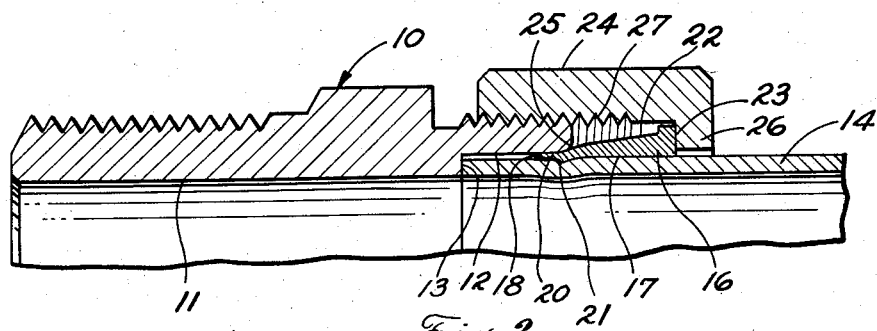
Fig. 2 is a cross-sectional view of a tube fitting according to this invention showing the position of the elements when the fitting is finally assembled.

As the sealing ring 16 is moved axially into the counter bore 12 of the body member 10, the conical surface 22 engages the rounded surface 25 and surface of the counter bore 12 and is radially cammed inwardly toward the outer surface of the tube 14. The diameter of the counter bore 12 is larger than the outside diameter of the tube 14 so that a clearance is provided between the surfaces thereof and this clearance is preferably arranged so that the radial extent is slightly larger than the end 18 of the sealing ring 16. However, it is also arranged so that the clearance is less than the radial extent of the pilot portion 20 at a point rearwardly from the end 18, so the surface of the tube is engaged by the pilot portion in an area just rearwardly from the end 18. It is apparent from Fig. 2 that the end 18 of the sealing ring tends to follow the surface of the counter bore 12 and therefore not engage the surface of the tube. This insures easy assembly of the fitting and a good seal since the surface of the tube is not scratched by the end 18.

As the nut 24 moves the sealing ring 16 axially relative to the bore 10 the pilot portion is cammed radially inward until the surface of the tube is engaged as described and at the same time, the cutting edge 21 engages the outer surface of the tube and cuts a groove therein which provides a generally radial abutting surface engaged by the cutting edge 21. In the preferred embodiment the various elements are proportioned so that the cutting edge is directly below the junction between the rounded surface 25 and the counter bore 12 when the assembly is completed. During this axial movement of the pilot portion along the outer surface of the tube, there is a radial compression between the inner surface of the pilot portion and the outer surface of the tube which will cause a slight radial deflection of the tubing. This axial motion also provides for a wiping action between these two surfaces which in conjunction with the radial pressure caused by the resistance of the tubing to the above mentioned deflection provides a good fluid seal. It should be understood, of course, that a good fluid seal is provided between the conical surface 22 and the counter bore 12 for the same reasons. Those skilled in the art will realize that by providing the fluid seal between the tube and the sealing ring and between the sealing ring and the body, all possibility of leakage is eliminated. It is apparent that the seal between the pilot portion of the outer surface of the tubing will be augmented by a seal provided by the cutting edge and the outer surface of the tube.

Because of the structural shape of the sealing ring those skilled in the art will realize that high production low cost method of manufacture may be used to produce the sealing ring. This fact is of utmost importance since it gives the producer a preferred competitive position in the industry.

Figure 4:
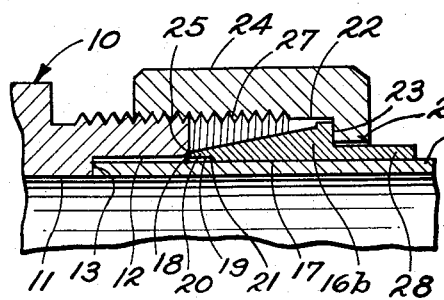
Figure 3:
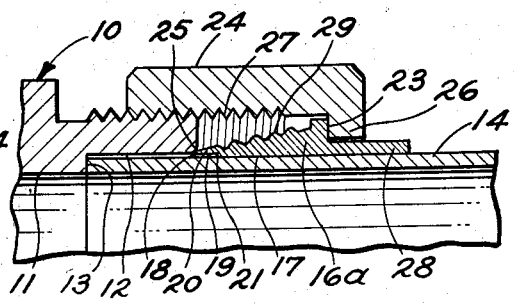
Fig. 3 is another embodiment of this invention loosely assembled wherein the cutting ring is formed with a plurality of annular grooves which assist the camming action; and, Fig. 4 is another embodiment of this invention loosely assembled wherein the cutting ring is formed with a tail which projects rearwardly through the nut.

In an alternative form of the sealing ring 16a and 16b shown in Figs. 3 and 4 the rearward end of the ring is formed with an aligning tail 28 which extends through the opening in the nut 24 defined by the shoulder 26 and serves to give added support to the tube 14 as well as provide an additional guiding surface for the nut 24. It should be understood that in a tube fitting according to this invention the sealing ring 16 is formed with a bore 17 closely fitting the outer surface of the tube so the tube is supported against vibration and the like by the entire length of the bore 17. It is apparent that this tail 28 also prevents the coupling from being assembled with the sealing ring positioned backward.

A sealing ring 16a is also provided with a plurality of annular grooves 29 in the conical surface which give added flexibility to the ring and also facilitate the axial movement thereof relative to the connecting part 10. The ribs between the grooves engage the body 10 thereby providing a series of engagements therebetween each of which results in an additional fluid seal.

It will be apparent to those skilled in the art that by providing the structure described above the fitting supports the tubing securely on both sides of the cutting edge 21 thereby preventing deflections or movement between the parts which would either cause wear or failure of the seal. A strong and permanent seal is also provided since the sealing ring rigidly urges the tube 14 against the shoulder 13 and thereby prevents any axial movement between the various elements of the assembled fitting.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A tube coupling comprising a first fitting member having a fluid conducting bore, a cylindrical counter bore adapted to receive the end of the tube, and an intermediate seat for an end of a tube, the diameter of said counter bore being larger than the diameter of said tube to provide clearance therebetween, a second fitting member having a bore and a shoulder facing said bore, means to draw said fitting members together, and a unitary cutting ring consisting entirely of a material harder than said tube; said cutting ring formed with an axial through bore of a diameter closely fitting the outside diameter of the tube being sealed, a rearward shoulder adapted to be engaged by said second member, a substantially conical camming surface extending from a minimum diameter adjacent to the forward end toward the rearward end, and a tube cutting edge spaced from the forward end; the portion of said ring forward of said cutting edge forming a pilot portion of a wedge shaped cross section, the rearward end of said pilot portion having a radial extent greater than the radial extent of said clearance, said ring being constructed and arranged so that when the coupling is assembled with the tube said ring is positioned between said first fitting member and the shoulder of said second fitting member surrounding said tube the end of which abuts said seat, said shoulder of said second fitting member urges said ring into said counter bore thereby camming said rearward end of said pilot portion and cutting edge radially into the outer surface of said tube.

2. A tube coupling comprising a first fitting member having a fluid conducting bore, a cylindrical counter bore adapted to receive the end of the tube, and an intermediate seat for an end of a tube, the diameter of said counter bore being larger than the diameter of said tube to provide clearance therebetween, a second fitting member having a bore and a shoulder facing said bore, means to draw said fitting members together, and a unitary cutting ring consisting entirely of a malleable material harder than said tube; said cutting ring formed with an axial through bore of a diameter closely fitting the outside diameter of the tube being sealed, a rearward shoulder adapted to be engaged by said second member, a substantially conical camming surface extending outwardly from a minimum diameter adjacent to the forward end toward the rearward end, and a tube cutting edge spaced from the forward end; the portion of said ring forward of said cutting edge forming a pilot portion of a wedge shaped cross section, the rearward end of said pilot portion having a radial extent greater than the radial extent of said clearance, said ring being constructed and arranged so that when the coupling is assembled with the tube said ring is positioned between said first fitting member and the shoulder of said second fitting member surrounding said tube the end of which abuts said seat, said shoulder of said second fitting member urges said ring into said counter bore thereby camming said rearward end of said pilot portion and cutting edge radially into the outer surface of said tube.

References Cited in the file of this patent

UNITED STATES PATENTS

| 1,889,778 | Dobrick | Dec. 6, 1932 |
| 1,927,464 | McIntosh | Sept. 19, 1933 |
| 2,201,404 | Kreidel | May 21, 1940 |
| 2,211,856 | Kreidel | Aug. 20, 1940 |
| 2,394,351 | Wurzburger | Feb. 5, 1946 |
| 2,536,745 | Herold | Jan. 2, 1951 |

FOREIGN PATENTS

| 370,187 | Italy | Apr. 10, 1939 |
| 564,182 | Great Britain | Sept. 15, 1944 |